(12) United States Patent
Eling et al.

(10) Patent No.: US 9,403,932 B2
(45) Date of Patent: *Aug. 2, 2016

(54) PROCESS FOR PRODUCING SILICA-COMPRISING POLYOL DISPERSIONS AND THEIR USE FOR PRODUCING POLYURETHANE MATERIALS

(75) Inventors: Berend Eling, Lemfoerde (DE); Zeljko Tomovic, Lemfoerde (DE); Stefan Auffarth, Westerkappeln (DE); Alexander Traut, Mannheim (DE)

(73) Assignee: BASF SE, Ludwigshafen (DE)

( * ) Notice: Subject to any disclaimer, the term of this patent is extended or adjusted under 35 U.S.C. 154(b) by 1021 days.

This patent is subject to a terminal disclaimer.

(21) Appl. No.: 13/123,672

(22) PCT Filed: Oct. 8, 2009

(86) PCT No.: PCT/EP2009/063065
§ 371 (c)(1),
(2), (4) Date: Apr. 11, 2011

(87) PCT Pub. No.: WO2010/043530
PCT Pub. Date: Apr. 22, 2010

(65) Prior Publication Data
US 2011/0266497 A1  Nov. 3, 2011

(30) Foreign Application Priority Data
Oct. 15, 2008 (EP) .................................... 08166633

(51) Int. Cl.
| | | |
|---|---|---|
| C08G 18/00 | (2006.01) | |
| C08G 18/38 | (2006.01) | |
| B82Y 30/00 | (2011.01) | |
| C01B 33/145 | (2006.01) | |
| C01B 33/151 | (2006.01) | |
| C09C 1/30 | (2006.01) | |

(52) U.S. Cl.
CPC ............. *C08G 18/3895* (2013.01); *B82Y 30/00* (2013.01); *C01B 33/145* (2013.01); *C01B 33/151* (2013.01); *C09C 1/30* (2013.01); *C09C 1/3081* (2013.01); *C01P 2004/62* (2013.01); *C01P 2004/64* (2013.01); *C01P 2006/22* (2013.01); *C01P 2006/82* (2013.01)

(58) Field of Classification Search
CPC .. C01B 33/151; C01B 33/145; C09C 1/3081; C09C 1/30; C08G 18/3895; C01P 2004/64; C01P 2006/82; C01P 2006/22; C01P 2004/62; B82Y 30/00

USPC ..................... 516/34; 524/492, 493
See application file for complete search history.

(56) References Cited

U.S. PATENT DOCUMENTS

| | | | | |
|---|---|---|---|---|
| 4,499,217 | A * | 2/1985 | Yoshimura et al. ........... | 524/493 |
| 5,683,501 | A * | 11/1997 | Tomihisa et al. ............. | 106/490 |
| 5,780,531 | A * | 7/1998 | Scholl ............................ | 523/213 |
| 6,025,455 | A * | 2/2000 | Yoshitake et al. .............. | 516/34 |
| 6,579,929 | B1 * | 6/2003 | Cole et al. ..................... | 524/493 |
| 6,750,273 | B2 * | 6/2004 | Chao ............................. | 524/493 |
| 2003/0143345 | A1 * | 7/2003 | Satou et al. ................... | 428/32.1 |
| 2004/0147029 | A1 | 7/2004 | Adam | |
| 2005/0043425 | A1 | 2/2005 | Beck et al. | |
| 2006/0122314 | A1 * | 6/2006 | Wu et al. ....................... | 524/493 |
| 2008/0069753 | A1 * | 3/2008 | Floess et al. .................. | 423/335 |
| 2008/0306203 | A1 | 12/2008 | Adam et al. | |
| 2011/0313070 | A1 * | 12/2011 | Eling et al. .................... | 977/773 |
| 2012/0065341 | A1 | 3/2012 | Eling et al. | |
| 2012/0108779 | A1 | 5/2012 | Kunst et al. | |

FOREIGN PATENT DOCUMENTS

| | | |
|---|---|---|
| DE | 103 38 164 | 3/2005 |
| EP | 0 699 626 | 3/1996 |
| EP | 0 775 669 A2 * | 11/1996 |
| EP | 1 236 765 | 9/2002 |
| EP | 1 366 112 | 7/2004 |
| WO | 01 05883 | 1/2001 |
| WO | 2004 035473 | 4/2004 |
| WO | WO 2006/114420 A1 * | 11/2006 |
| WO | 2006 128793 | 12/2006 |
| WO | WO 2006/128793 A1 * | 12/2006 |

OTHER PUBLICATIONS

International Search Report issued Jan. 25, 2010 in PCT/EP09/63065 filed Oct. 8, 2009.

* cited by examiner

*Primary Examiner* — Daniel S Metzmaier
(74) *Attorney, Agent, or Firm* — Oblon, McClelland, Maier & Neustadt, L.L.P.

(57) ABSTRACT

Provided is a process for producing silicate-comprising polyols, comprising (i) admixing an aqueous silica sol (K) having an average particle diameter 1-150 nm, silica content 1-60% by weight and a pH of 1-6, with a 0.1- to 20-fold amount of at least one organic solvent (L), (ii) admixing the resulting mixture with a polyol, (iii) removing at least partially water and the organic solvent (L) by distillation, (iv) admixing with 0.1-30 mol % of at least one compound (S) which has at least one at least monoalkoxylated silyl group and at least an alkyl, cycloalkyl or aryl substituent, which may contain heteroatoms, wherein the substituent optionally contains a group reactive toward an alcohol, an amine or an isocyanate, and (v) optionally adjusting the pH of the silicate-comprising polyol to 7-12 by addition of a basic compound.

19 Claims, No Drawings

PROCESS FOR PRODUCING SILICA-COMPRISING POLYOL DISPERSIONS AND THEIR USE FOR PRODUCING POLYURETHANE MATERIALS

The invention relates to a process for producing silica-comprising polyol dispersions and their use for producing polyurethane materials.

It is known that the mechanical properties of polyurethane materials can be influenced in a targeted manner by the presence of nanoparticles in the components of the polyurethane materials (isocyanate or polyol component).

Thus, DE-A 103 38 164 discloses a process for producing a polyurethane foam, which comprises reacting a polyisocyanate and a polyol in the presence of a blowing agent and of silica gel particles, with the silica gel particles being functionalized with aminopropyltriethoxysilane. The silanizing reagent makes the particle surface of the silica gel particles hydrophilic, with this hydrophilic surface having surface groups which are reactive toward isocyanate. As a result, the particles are covalently bound into the polymer matrix of the foam during the polymerization reaction to form the polyurethane form and act as reinforcing material. This enables the proportion of open cells in the polyurethane foam to be regulated, which can lead to an improvement in the acoustic properties (sound damping) and the thermal insulation capability of the polyurethane foam. The surface-functionalized $SiO_2$ particles are incorporated into the polyol component. The $SiO_2$ particles are preferably produced from tetraethoxysilane in an organic solvent. This synthetic route is costly since an expensive precursor is used and, in addition, the particle yield in the synthesis is low. Furthermore, this synthesis gives particles having a size of 100 nm or more, which can be considered to be conventional fillers.

EP-A 1 366 112 discloses a process for producing a silicon dioxide dispersion by a) initial charging of an aqueous silicate solution, b) polycondensation of the silicate to a particle size of from 3 to 50 nm, c) adjustment of the silica sol obtained to an alkaline pH, d) optionally concentration of the sol e) mixing of the sol with constituents of the outer, flowable phase of the dispersion and f) optionally removal of water and/or other solvent constituents from the dispersion. Outer flowable phases mentioned are polyols, polyamines, linear or branched polyglycol ethers, polyesters and polylactones. In the examples, a silica sol whose pH has been set to 10.5-11 is mixed with isopropanol and the water is removed to a content of <0.1% by atmospheric distillation. Various polyethers are then added while stirring. The volatile constituents are subsequently removed by distillation at 50° C. under reduced pressure. Mention is made of the use of the silicon dioxide dispersions for the production of closed-cell or open-cell foams based on polyurethanes, polysiloxanes, polyolefins or polystyrene. The sols have a pH of from 10 to 12 and are therefore difficult to handle. The sols have only a low concentration of silicon dioxide particles (up to 15 parts of $SiO_2$ particles per 100 parts of sol). Relatively large amounts of solvent are required, which makes the production of the silicon dioxide dispersions relatively expensive.

EP-A 0 699 626 discloses a process for producing a stable silicon dioxide-propanol sol by replacing the aqueous medium of an acidic aqueous silicon dioxide sol by propanol by adding propanol to the silicon dioxide sol and distilling the sol, with methanol also being added. The presence of polyol is not mentioned. The sols are used as component in coating compositions for producing hard and thin films on lenses, bottles and films of synthetic resins, with the colloidal silicon dioxide functioning as microfiller in the hard and thin film formed.

WO 01/05883 discloses a process for producing polyurethane elastomers comprising nanosize fillers. These are exclusively polyester-based elastomers. Silicon dioxide having a pH of 8-9 in isopropanol is used as starting material for producing such elastomers.

WO 2004/035473 discloses a process for producing silanized colloidal silicon dioxide dispersions and their use in coating compositions or as additive for cement materials. For this purpose, an aqueous silica sol is preferably mixed with a silane, in particular an epoxysilane, diluted with water at a pH of preferably from 6 to 12.

WO 2006/128793 relates to a process for producing pulverulent colloidal particles of amorphous silicon dioxide. Here, an alkali-stabilized silica sol having a particle size in the range from 8 to 250 nm is diluted with water and/or a water-soluble organic solvent, a silane and/or a polyol or a dicarboxylic acid are/is added, the sol is deionized by means of an anion exchanger or cation exchange resin, the silylated deionized sol is dried under reduced pressure and the dried sol is optionally milled to a fine powder.

The silylated silicon dioxide powder can be dispersed in the polyol component or in the isocyanate component for the production of polyurethanes. The redispersion of particles having a particle size significantly below 100 nm can be difficult, since the particle-particle interactions are too high to obtain agglomerate-free dispersions, for example in polyol. The handling of the fine powder also requires occupational hygiene precautions.

It is an object of the invention to provide low-viscosity dispersions of silicon dioxide particles having a diameter of the particles of <150 nm in polyols. The process for producing the silica-comprising polyol dispersions should be able to be carried out starting from commercially available water-based silica sols.

The object is achieved by a process for producing silica-comprising polyol dispersions, which comprises the steps (i) admixing of an aqueous silica sol (K) having an average particle diameter of from 1 to 150 nm and a silica content, calculated as $SiO_2$, of from 1 to 60% by weight and having a pH of from 1 to 6 with a 0.1- to 20-fold amount (based on the amount of water) of at least one organic solvent (L) selected from the group consisting of methanol, ethanol, 1-propanol, 2-propanol, 1-butanol, 2-butanol, 2-methyl-2-propanol, 1-chloro-2-propanol, cyclopentanol, cyclohexanol, 1,4-dioxane, tetrahydrofuran, 1-methoxy-2-propanol, 1-ethoxy-2-propanol, 2-ethoxyethanol, 2-methyl-2-propanol, 2-methoxyethanol, dimethylformamide, acetonitrile, dimethyl sulfoxide acetone, methylethylketone and ethylacetate.

and (ii) admixing of the resulting mixture with at least one polyol, (iii) at least partial removal of the water and organic solvent (L) by distillation, (iv) admixing with at least one compound (S) which has at least one at least monoalkoxylated silyl group and at least one alkyl, cycloalkyl or aryl substituent, which may contain heteroatoms, where this substituent optionally has groups which are reactive toward an alcohol, an amine or an isocyanate, in an amount of from 0.1 to 20 μmol of (S) per m² of surface area of (K), with the steps (i), (ii) and (iv) being able to be carried out simultaneously or in succession in any order, (v) optionally adjustment of the pH of the silica-comprising polyol dispersions obtained to a value of from 7 to 12 by addition of a strongly basic compound, with step (v) also being able to be carried out between steps (iii) and (iv).

Adjustment of the pH of the aqueous silica sol (K) to a value of from 1 to 6, preferably from 2 alters the solubility properties of the aqueous silica sol. At a low pH, alcohols which form an azeotrope with water can be used as organic solvents (L). Preferred alcohols (L) are 2-propanol, 1-propanol, 1-methoxy-2-propanol, 2-butanol and mixtures thereof.

After addition of the solvent (L) and of the polyol, solvent and water are distilled off at a temperature of preferably from 30 to 140° C., in particular from 60 to 120° C., and under reduced pressure at a pressure of preferably <100 hPa.

The aqueous colloidal solutions (K) of polysilicic acid particles (silica sol) used comprise particles having an average particle diameter of from 1 to 150 nm, preferably from 2 to 120 nm, particularly preferably from 3 to 100 nm, very particularly preferably from 4 to 80 nm, in particular from 5 to 50 nm and especially from 8 to 40 nm.

The silica content, calculated as $SiO_2$, is from 1 to 60% by weight, preferably from 10 to 60, particularly preferably from 10 to 40% by weight. Silica sols having a lower content can also be used, but the additional content of water then has to be separated off by distillation in a later step.

The aqueous solutions (K) are colloidal solutions of polysilicic acid which can, if appropriate, be stabilized to a small extent by alkali metal, alkaline earth metal, ammonium, aluminum, iron(II), iron(III) and/or zirconium ions, preferably alkali metal, alkaline earth metal, ammonium and/or iron(III) ions, particularly preferably alkali metal, alkaline earth metal and/or ammonium ions, very particularly preferably alkali metal and/or alkaline earth metal ions and in particular alkali metal ions.

Among alkali metal ions, preference is given to sodium and/or potassium ions, particularly preferably sodium ions.

Among alkaline earth metal ions, preference is given to magnesium, calcium and/or beryllium ions, particularly preferably magnesium and/or calcium ions, very particularly preferably magnesium ions.

The molar ratio of metal ions to silicon atoms in (K) is from 0:1 to 0.1:1, preferably from 0.002 to 0.04:1.

After adjustment of the pH, the silica sol (K) used has a pH of the aqueous phase of from 1 to 6, preferably from 2 to 6, more preferably from 2 to 4.

For the purposes of the present text, an aqueous colloidal solution is a solution of optionally stabilized silica particles which have an average particle diameter in the range from 1 to 150 nm and do not settle even during storage for a period of one month at 20° C.

For the purposes of the present text, a sol is a colloidally disperse, incoherent (i.e. each particle is freely mobile) solution of a solid in water; here, a silica sol is a colloidally disperse solution of silicon dioxide in water.

The acidic aqueous silica sol (K) used according to the invention can, for example, be obtained in three different ways:
 by acidification of the corresponding alkaline silica sols,
 by preparation from low molecular weight silicic acids, preferably water glass, i.e. salt-like particles having a diameter below 1 nm, or
 by condensation of esters of low molecular weight silicic acids.

The aqueous solutions of alkaline silica sols generally have a pH of from 8 to 12, preferably from 8 to 11. These alkaline silica sols are commercially available and therefore represent a readily available and preferred starting material for the process of the invention.

The particles in these alkaline silica sols usually have an average particle diameter of from 1 to 150 nm, preferably from 2 to 120 nm, particularly preferably from 3 to 100 nm, very particularly preferably from 4 to 80 nm, in particular from 5 to 50 nm and especially from 8 to 40 nm.

The silica content, calculated as $SiO_2$ is from 1 to 60% by weight, preferably from 10 to 60% by weight, particularly preferably from 10 to 40% by weight. It is also possible to use alkaline silica sols having a lower solids content, but the additional content of water then has to be separated off by distillation in a later step.

The alkaline silica sols can be stabilized by means of the abovementioned metal ions.

The molar ratio of metal ions to silicon atoms in (K) is from 0:1 to 0.1:1, preferably from 0.002 to 0.04:1.

The pH of these alkaline silica sols is generally at least 8, preferably from 8 to 12, particularly preferably from 8 to 11 and very particularly preferably from 8 to 10.

The preparation of the silica sols (K) to be used according to the invention from these alkaline silica sols is effected by setting the desired pH in these silica sols, for example by addition of mineral acids or admixing the alkaline silica sols with an ion exchanger.

Acidification can be carried out using any acids, preferably hydrochloric acid, nitric acid, phosphoric acid, sulfuric acid, acetic acid, formic acid, methylsulfonic acid, para-toluene sulfonic acid, or by admixing with an acidic ion exchanger, preferably by acidification with hydrochloric acid, nitric acid, phosphoric acid, sulfuric acid or acetic acid, particularly preferably with hydrochloric acid, nitric acid or sulfuric acid and very particularly preferably by acidification with sulfuric acid.

In a preferred embodiment, the silica sols (K) are produced by admixing alkaline silica sols with an ion exchanger. This results in the electrolyte content of the silica sols (K) being low, for example, less than 0.2% by weight and preferably less than 0.1% by weight.

For the present purposes, electrolytes are inorganic ionic constituents other than silicates, hydroxides and protons. These electrolytes which originate predominantly from the stabilization of the alkaline silica sols are added to the suspension after the latter has been produced in order to stabilize the particles.

It is also conceivable to produce the silica sols (K) from water glass by acidification, for example by means of an ion exchanger or by admixing with mineral acid. As water glass for this purpose, preference is given to using potassium and/or sodium silicate which particularly preferably has a ratio of from 1 to 10 mol of $SiO_2$ to 1 mol of alkali metal oxide, very particularly preferably from 1.5 to 6 and in particular from 2 to 4 mol of $SiO_2$ to 1 mol of alkali metal oxide.

In this case, the reaction mixture is allowed to react until a silica sol (K) of the desired size has been formed, and the process of the invention is then continued.

The low molecular weight silicic acids (orthosilicic and oligosilicic acid) are normally stable only in highly dilute aqueous solutions having a content of a few percent by weight and are therefore generally concentrated before further use.

Furthermore, the silica sols (K) can be produced by condensation of esters of low molecular weight silicic acids. These are usually $C_1$-$C_4$-alkyl, in particular ethyl esters of oligosilicic and in particular orthosilicic acid which form acidic or basic silica sols (K).

In the step (i), the aqueous acidic silica sol is admixed with a 0.1- to 20-fold, preferably 0.3- to 15-fold, particularly preferably 0.5- to 10-fold and very particularly preferably 1- to 5-fold, amount (based on the amount of water of the silica sol used) of at least one organic solvent (L). Dilution with water is optionally carried out beforehand or simultaneously.

The organic solvent (L) is selected according to the following criteria: it should have both sufficient miscibility with water and be miscible with the polyol under the mixing conditions.

The miscibility with water under the reaction conditions should be at least 5% by weight (based on the finished water-solvent mixture), preferably at least 25% by weight and particularly preferably at least 70% by weight; in particular, the solvent should form a homogenous solution in all mixing ratios with water, since when the miscibility is too low, there is a risk that a gel will be formed from the modified silica sol or relatively large nanoparticle aggregates will flocculate.

The polyol should be completely soluble in the solvent (L) or the water-solvent mixture.

In addition, the solvent (L) is preferably able to suspend at least 2 g/l of the silicates formed without sedimentation.

Furthermore, the solvent (L) should have a boiling point of less than 150° C. in a pressure range from atmospheric pressure to 5 hPa, so that it can be separated off easily by distillation.

The solvent (L) serves as entrainer for the removal of water. In a preferred embodiment, the solvent (L) forms an azeotrope or heteroazeotrope with water under the conditions of the distillation, so that the distillate forms an aqueous phase and an organic phase after the distillation.

Examples of suitable solvents (L) are methanol, ethanol, 1-propanol, 2-propanol, 1-butanol, 2-butanol, 2-methyl-2-propanol, 1-chloro-2-propanol, cyclopentanol, cyclohexanol, 1,4-dioxane, tetrahydrofuran, 1-methoxy-2-propanol, 1-ethoxy-2-propanol, 2-ethoxyethanol, 2-methyl-2-propanol, 2-methoxyethanol, dimethylformamide, acetonitrile, dimethyl sulfoxide and acetone. Further examples are methylethylketone and ethylacetate.

In step (ii), the polyol is introduced into this solution. Preferred polyols are polyetheroles (b1). Suitable polyetheroles (b1) preferably have a molecular weight of greater than 96 g/mol. Further preferred is polytetrahydrofurane (b3) having a molar weight of from 550 to 4000 g/mol.

Polyetheroles (b1) are prepared by known processes, for example from one or more alkylene oxides having from 2 to 4 carbon atoms in the alkylene radical by anionic polymerization using alkaline metal hydroxides or alkaline metal alkoxides as catalysts with addition of at least one starter molecule which usually has from 2 to 10 reactive hydrogen atoms in bound form or by cationic polymerization using Lewis acids such as antimony pentachloride or boron fluoride etherate. Suitable alkylene oxides are, for example, tetrahydrofuran, 1,3-propylene oxide, 1,2- or 2,3-butylene oxide and preferably ethylene oxide and 1,2-propylene oxide. Furthermore, it is also possible to use multimetal cyanide compounds, known as DMC catalysts, as catalysts. Furthermore, tertiary amines can be employed as catalysts, for example triethylamine, tributylamine, trimethylamine, dimethylethanolamine or dimethylcyclohexylamine. The alkylene oxides can be used individually, alternately in succession or as mixtures.

Preferred polyols are based on propylene oxide and ethylene oxide. Suitable polyols comprise slabstock foam polyols, molded foam polyols, rigid foam polyols, C.A.S.E. polyols ("coatings, adhesives, sealants, elastomers") and glycols such as polypropylene glycol. The polyol functionality can be from 2 to 10, the molecular weight can be from 96 to 20 000 g/mol and the polypropylene oxide content is in general from 50 to 100% by weight, preferably from 50 to 99% by weight.

The polyols can also be used for preparing polyisocyanate prepolymers.

Possible starter molecules are water or 2- and 3-functional alcohols such as ethylene glycol, 1,2- and 1,3-propanediol, diethylene glycol, dipropyleneglycol, 1,4-butanediol, glycerol, trimethylolpropane, pentaerythritol, sorbitol and sucrose. Further possibilities are polyols based on amine starters such as triethanolamine, diethanolamine, ethylenediamine and toluene diamine.

Polytetrahydrofuran can also be used as polyetherol. Here, the number average molecular weight of the polytetrahydrofuran is usually from 550 to 4000 g/mol, preferably from 750 to 3000 g/mol, particularly preferably from 800 to 2500 g/mol and in particular about 2000 g/mol.

It is also possible to use mixtures of polyetherols.

In a step (iii), water and organic solvent are distilled off from this solution. The removal of water and the organic solvent (L) by distillation is carried out under atmospheric or reduced pressure, preferably from 100 hPa to atmospheric pressure, particularly preferably from 50 hPa to atmospheric pressure, very particularly preferably from 20 hPa to atmospheric pressure and in particular from 10 hPa to atmospheric pressure.

The temperature at which the distillation is carried out depends on the boiling point of water and/or the organic solvent (L) at the respective pressure.

The distillation conditions are preferably selected so that the organic solvent acts as an effective entrainer for water under the conditions, in particular so that water and the organic solvent form an azeotrope under the conditions.

The temperature is preferably not more than 140° C., particular preferably not more than 120° C.

The distillation can be carried out batchwise, semicontinuously or continuously.

For example, it can be carried out batchwise from a stirred vessel which can, if appropriate, be superposed by a short rectification column.

The introduction of heat into the stirred vessel is effected via internal and/or external heat exchangers of a conventional type and/or double wall heating, preferably external circulation vaporizers with natural convection or forced circulation. The mixing of the reaction mixture is effected in a known manner, e.g. by stirring, pump circulation or natural convection.

In a continuous embodiment, the distillation is preferably carried out by passing the mixture to be distilled through a falling film evaporator or a heat exchanger.

Distillation apparatuses which are suitable for this purpose are all distillation apparatuses known to those skilled in the art, e.g. circulation evaporators, thin film evaporators, falling film evaporators, wiped film evaporators, if appropriate in each case with superposed rectification columns or stripping columns. Suitable heat exchangers are, for example, Robert vaporizers or tube or plate heat exchangers.

Water and solvent (L) are generally largely distilled off. The content of silica in the polyol is from 5 to 60% by weight, preferably from 5 to 50% by weight and particularly preferably from 10 to 40% by weight.

The residual content of water in the finished product should be less than 5% by weight, preferably less than 3% by weight, particularly preferably less than 2% by weight, very particularly preferably less than 1% by weight, in particular less than 0.5% by weight and especially less than 0.3% by weight.

The residual content of solvent (L) in the finished product should be less than 5% by weight, preferably less than 1% by weight, particularly preferably less than 0.5% by weight and very particularly preferably less than 0.2% by weight.

The removal of the water can also be carried out by absorption, pervaporation or diffusion through membranes instead of distillation.

According to the invention, the silica particles are surface-modified in step (iv) by addition of a silane (S). The silane (S) has at least one, preferably precisely one, at least monoalkoxylated, for example monoalkoxylated to trialkoxylated, preferably dialkoxylated to trialkoxylated, particularly preferably precisely trialkoxylated, silyl group. In addition, the silane has at least one alkyl, aryl or cycloalkyl substituent, with this substituent optionally having heteroatoms which can be non-reactive or reactive toward an alcohol, an amine or an isocyanate.

For the purposes of the present invention, alkoxylated silyl groups are groups $(R^1-O-)_n-Si-$ where
$R^1$ is $C_1$-$C_{20}$-alkyl, preferably $C_1$-$C_4$-alkyl, and
n is an integer from 1 to 3, preferably from 2 to 3 and particularly preferably 3.

Examples of $C_1$-$C_{20}$-alkyl are methyl, ethyl, isopropyl, n-propyl, n-butyl, isobutyl, sec-butyl, tert-butyl, n-hexyl, n-heptyl, n-octyl, 2-ethylhexyl, n-decyl, n-dodecyl, n-tetradecyl, n-hexadecyl, n-octadecyl and n-eicosyl.

Examples of $C_1$-$C_4$-alkyl are methyl, ethyl, isopropyl, n-propyl, n-butyl, isobutyl, sec-butyl and tert-butyl.

Preferred radicals $R^1$ are methyl, ethyl, n-butyl and tert-butyl, particularly preferably methyl and ethyl.

Substituents can be either reactive or unreactive toward an alcohol, an amine or an isocyanate. The unreactive substituents can be alkyl, cycloalkyl or aryl groups having 1 to 20 C-atoms such as $C_1$-$C_{20}$-alkyl e.g. methyl, ethyl, isopropyl, n-propyl, n-butyl, isobutyl, sec-butyl, tert-butyl, n-hexyl, n-heptyl, n-octyl, 2-ethylhexyl, n-decyl, n-dodecyl, n-tetradecyl, n-hexadecyl, n-octadecyl, n-eicosyl, cyclohexyl and phenyl.

Preferred compounds (S) are methyltrimethoxysilane, n-propyltriethoxysilane, dimethyldimethoxysilane, phenyltrimethoxysilane, n-octyltriethoxysilane, isobutyltriethoxysilane, n-butyltrimethoxysilane, t-butyltrimethoxysilane, methyltriethoxysilane, benzyltriethoxysilane, trimethylmethoxysilane, vinyltrimethoxysilane, vinyltriethoxysilane, allyltrimethoxysilane, allyltriethoxysilane, butenyltriethoxysilane, n-decyltriethoxysilane, di-n-butyldimethoxysilane, diisopropyldimethoxysilane, dimethyldiethoxysilane, dodecylmethyldiethoxysilane, dodecyltriethoxysilane, ethyltrimethoxysilane, ethyltriethoxysilane, hexadecyltriethoxysilane, hexadecyltrimethoxysilane, hexyltrimethoxysilane, hexyltriethoxysilane, isobutylmethyltriethoxysilane, isobutyltrimethoxysilane, n-octadecyltriethoxysilane, n-octadecyltrimethoxysilane, n-octadecylmethyldimethoxysilane, n-octadecylmethyldiethoxysilane, n-octylmethyldiethoxysilane, octyldimethylmethoxysilane, pentyltriethoxysilane, phenylmethyldimethoxysilane, phenyltriethoxysilane.

The unreactive groups can also have heteroatoms, e.g. ether and thioether groups. A particular class of the substituents is formed by monofunctional polyoxyalkylene compounds, e.g. compounds based on ethylene oxide and propylene oxide.

Preferred compounds (S) are 2-[methoxy(polyethylenoxy)propyl]trimethoxysilane, 3-methoxypropyltrimethoxysilane, bromophenyltrimethoxysilane, 3-bromopropyltrimethoxysilane, 2-chloroethylmethyldimethoxysilane, (heptadecafluoro-1,1,2,2-tetrahydrodecyl)triethoxysilane, (heptadecafluoro-1,1,2,2-tetrahydrodecyl)trimethoxysilane, diethylphosphatoethyltriethoxysilane, 2-(diphenylphosphino)ethyltriethoxysilane, 3-(N,N-dimethylaminopropyl)trimethoxysilane, 3-methoxypropyltrimethoxysilane, 3-(methacryloxy)propyltrimethoxysilane, 3-acryloxypropyltrimethoxysilane, 3-(methacryloxy)propyltriethoxysilane, 3-(methacryloxy)propylmethyldimethoxysilane.

The reactive groups are generally joined to the silyl groups via alkylene, cycloalkylene or arylene groups, preferably alkylene groups, as spacer groups.

Examples are methylene, 1,2-ethylene (—$CH_2$—$CH_2$—), 1,2-propylene (—$CH(CH_3)$—$CH_2$—) and/or 1,3-propylene (—$CH_2$—$CH_2$—$CH_2$—), 1,2-, 1,3- and/or 1,4-butylene, 1,1-dimethyl-1,2-ethylene, 1,2-dimethyl-1,2-ethylene, 1,6-hexylene, 1,8-octylene or 1,10-decylene, preferably methylene, 1,2-ethylene, 1,2- or 1,3-propylene, 1,2-, 1,3- or 1,4-butylene, particularly preferably methylene, 1,2-ethylene, 1,2- and/or 1,3-propylene and/or 1,4-butylene and very particularly preferably methylene, 1,2-ethylene, 1,2- and/or 1,3-propylene.

Preferred reactive groups are a primary amino group, a hydroxide group, a thiol group and an epoxy group.

Preferred compounds (S) are 2-(3,4-epoxycyclohexyl)ethyltriethoxysilane, 2-(3,4-epoxycyclohexyl)ethyltrimethoxysilane, 3-aminopropylmethyldimethoxysilane, 3-aminopropyldimethylmethoxysilane, 3-aminopropyldimethylethoxysilane, N-(2'-aminoethyl)-3-aminopropylmethyldimethoxysilane, N-(2'-aminoethyl)-3-aminopropylmethyldiethoxysilane, N-(2'-aminoethyl)-3-aminopropylmethoxysilane, N-(2'-aminoethyl)-3-aminopropylethoxysilane, 3-mercaptopropyltrimethoxysilane, 3-mercaptopropyltriethoxysilane, 4-aminobutyltriethoxysilane, 1-amino-2-(dimethylethoxysilyl)propane, (aminoethylaminoethyl)phenethyltrimethoxysilane, N-(2-aminoethyl)-3-aminopropyltriethoxysilane, p-aminophenyltrimethoxysilane, 3-aminopropylmethyldiethoxysilane, 3-aminopropyltriethoxysilane, 3-aminopropyltrimethoxysilane, 11-aminoundecyltriethoxysilane, (3-glycidoxypropyl)trimethoxysilane, (3-glycidoxypropyl)triethoxysilane, N-(hydroxyethyl)-N-methylaminopropyltrimethoxysilane, hydroxymethyltriethoxysilane, 3-mercaptopropylmethyldimethoxysilane, 3-mercaptopropylmethyldiethoxysilane, N-methylaminopropylmethyldimethoxysilane, bis(2-hydroxyethyl)-3-aminopropyltriethoxysilane.

Particularly preferred compounds (S) are trialkoxysilanes substituted by the following groups:

$CH_2-CH_2-CH_2-NH_2$ $CH_2-CH_2-CH_2-SH$ $CH_2-CH_2-CH_2-NH-CH_2-CH_2-CH_2-NH_2$ $CH_2-CH_2-CH_2-N(CH_2-CH_2OH)_2.$

The groups mentioned react with isocyanate groups and thus result in covalent bonding of the silicate particles to the PU matrix. Preference is also given to trialkoxysilanes which are substituted by a glycidoxypropyl group —$CH_2$—$CH_2$—$CH_2$—O—$CH_2$—$CH(O)CH_2$. The epoxy group can react with amino groups, for example monofunctional polyetheramines or components bearing hydroxyl groups, for example hyperbranched polyols.

Silane compounds having two or more spacer groups can also be employed. Such compounds are described in WO 2004/035649. Examples are bis(3-methyldimethoxysilylpropyl)polypropylene oxide, bis(triethoxysilyl)ethane, bis(triethoxysilyl)octane, 1,6-bis(trimethoxysilyl)hexane, bis(methyldiethoxysilylpropyl)amine and bis(triethoxysilylpropyl) amine.

The reaction with the compound (S) modifies the surface of the silica sol (K) used so that the compatibility between the originally polar silica sol and the polyol is improved. Particular effects can be produced in a targeted manner by combining the various silanes, e.g. by combining reactive and unreactive silanes. It is also possible to use mixtures of silica particles modified in different ways.

In general (S) is used in an amount of from 0.1 to 20 µmol per $m^2$ of surface area of (K).

This generally corresponds to an amount of from 0.01 to 5 mmol of (S) per gram of (K), preferably from 0.05 to 4 mmol of (S) per gram of (K) and particularly preferably from 0.1 to 3 mmol of (S) per gram of (K).

For this purpose the reaction with (S) is carried out at a temperature of from 10 to 100° C., preferably from 20 to 90° C., particularly preferably from 30 to 80° C., while stirring.

Under these reaction conditions, the mixture is allowed to react for from 1 to 48 hours, preferably from 2 to 48 hours, particularly preferably from 2 to 36 hours, particularly preferably from 4 to 24 hours.

The silane (S) is added in amounts of from 0.1 to 30 mol %, preferably from 0.3 to 25 mol % and particularly preferably from 0.5 to 20 mol %, based on the $SiO_2$ content.

The silane (S) can be added to the mixture of aqueous silica sol (K) and solvent (L) obtained in step (i).

However, the silane (S) is preferably added after (ii) admixing of the mixture with the polyol and (iii) at least partial removal of the organic solvent (L) by distillation. If the silane (S) is added only after the distillation step (iii), a second distillation step in which any solvent introduced with the silane and also further volatile constituents are removed is preferably carried out.

In an optional step (v), the pH of the silicate-comprising polyol is set to a value of from 7 to 12. This is effected by addition of a strongly basic compound. Suitable strongly basic compounds are alkali metal hydroxides (NaOH, KOH, LiOH) and alkali metal alkoxides. The reactivity of the polyol component can be increased by addition of the strongly basic compound. This is attributed to acidic silanol groups on the surface of the silica particles being able to adsorb the amine catalyst, as a result of which the reactivity of the polyurethane system is reduced. This can be countered by addition of a basic compound.

The adjustment of the pH by addition of a strongly basic compound can also be carried out before addition of the silane. In one embodiment of the process of the invention, the pH is firstly set to a value of from 7 to 12, any solvent introduced with the strongly basic compound is at least partly distilled off, the silane (S) is subsequently added and volatile constituents are distilled off after the silanization. In a further embodiment of the process of the invention, the silane (S) is added first, the pH is subsequently adjusted to a value of from 7 to 12 by addition of the strongly basic compound and volatile constituents are removed after the silanization.

The silicate-containing polyols produced according to the invention can be used as polyol component for producing polyurethanes. The field of use of the silica-comprising polyols produced according to the invention is very broad. For example, they can be used for producing compact polyurethane, e.g. adhesives, coatings, binders, encapsulating compositions, thermoplastic polyurethanes and elastomers. They can also be used for producing microcellular polyurethane foam, for example for shoe applications, structural foam, integral foam and RIM polyurethanes, for example for bumper bars. They can also be used for producing high-density foams, e.g. semi-rigid foam and foam for carpet backing, low-density foams, e.g. flexible foam, rigid foam, thermomolding foam and packaging foam.

Polyurethane materials according to the invention are produced by mixing a) organic polyisocyanates with b) polyols containing silica-containing polyols, if appropriate c) chain extenders and/or crosslinkers, d) blowing agents, e) catalysts and if appropriate f) auxiliaries and additives to form a reaction mixture and allowing this reaction mixture to react fully.

The polyisocyanates a) used for producing the polyurethane materials according to the invention comprise compounds based on methanedi(phenyl isocyanate) (hereinafter referred to as MDI), tolylene diisocyanate, isophorone diisocyanate, naphthaline diisocyanate or hexamethylene diisocyanate. For the purposes of the present invention, MDI is 2,4-MDI, 4,4'-MDI and higher homologs having more than two rings and also mixtures thereof.

The polyisocyanate a) can be used in the form of polyisocyanate prepolymers. These polyisocyanate prepolymers can be obtained by reacting MDI as described above (a1), for example at temperatures of from 30 to 100° C., preferably about 80° C., with polyetherols (b1) and/or polyesterols (b2) to form the prepolymer. As polyetherols (b1), preference is given to using polyetherols as described above. Here, it is possible to use not only polyisocyanate prepolymers based on polyether and polyisocyanate prepolymers based on polyester but also mixtures thereof and polyisocyanate prepolymers based on polyethers and polyesters. The NCO content of the prepolymers is preferably, e.g. in the case of MDI-based prepolymers, in the range from 2% to 30%, particularly preferably from 5% to 28% and in particular from 10% to 25%.

As polyol components in the preparation of prepolymers, it is also possible to use the silica-comprising polyetherol dispersions of the invention.

If appropriate, customary chain extenders (c) are added to the polyols mentioned in the preparation of the isocyanateprepolymers. Such substances are described below under d).

As polyols b) can be employed polyetherols (b1) or poly-THF (b3) which are also employed in the silica-containing dispersions. However, other polyetherols (131), polyesterols (b2) and poly-THF (b3) can be likewise employed. Suitable polyols b) are described in The Polyurethane Book, Randall and Lee, Wiley 2002, pages 99-112. Suitable polyesterols (b2) are for example produced by condensation of polyfunctional alcohols, preferably diols, having 2 to 12 carbon atoms, preferably 2 to 6 carbon atoms, with polyfunctional carboxylic acids having 2 to 12 carbon atoms, for example succinic acid, glutaric acid, adipic acid, suberic acid, azelaic acid, sebacinic acid, decandicarboxylic acid, maleic acid, furmaric acid, phthalic acid, isophthalic acid, terephthalic acid and the isomeric naphthalene dicarboxylic acids.

Furthermore, blowing agents d) and/or water are present in the production of polyurethane foams. As blowing agents d), it is possible to use water and additionally generally known chemically and/or physically acting compounds. For the purposes of the present invention, chemical blowing agents are compounds which react with isocyanate to form gaseous products, for example water or formic acid. Physical blowing agents are compounds which are dissolved or emulsified in the starting materials for polyurethane production and vaporize under the conditions of polyurethane formation. These are, for example, hydrocarbons, halogenated hydrocarbons and other compounds, for example perfluorinated alkanes such as perfluorohexane, chlorofluorocarbons and ethers, esters, ketones, acetales and also inorganic and organic compounds which liberate nitrogen on heating, or mixtures thereof, for example (cyclo)aliphatic hydrocarbons having from 4 to 8 carbon atoms or fluorinated hydrocarbons such as Solkane® 365 mfc from Firma Solvay Fluorides LLC.

As chain extenders c), use is made of substances having a molecular weight of preferably less than 600 g/mol, particularly preferably from 56 to 600 g/mol, having 2 hydrogen atoms which are reactive toward isocyanates. These can be used individually or preferably in the form of mixtures. Preference is given to using diols having molecular weights of less than 600, particularly preferably from 60 to 400 and in particular from 60 to 300. Possible chain extenders are, for example, aliphatic, cycloaliphatic and/or araliphatic diols having from 2 to 14, preferably from 2 to 10, carbon atoms, e.g. ethylene glycol, 1,3-propanediol, pentanediol, tripropylene glycol, 1,10-decanediol, 1,2-, 1,3-, 1,4-dihydroxycyclohexane, diethylene glycol, dipropylene glycol and preferably 1,4-butanediol, 1,6-hexanediol and bis-(2-hydroxyethyl)hydroquinone, and low molecular weight hydroxyl-comprising polyalkylene oxides based on ethylene oxide and/or 1,2-propylene oxide and the abovementioned diols as starter molecules. Particular preference is given to using monoethylene glycol, diethylene glycol, 2-methyl-1,3-propanediol, 1,4-butanediol, 1,5-pentanediol, 1,6-hexanediol or mixtures thereof as chain extenders d).

If appropriate, crosslinkers can also be used together with or instead of chain extenders. These are substances having a molecular weight of less than 450 g/mol and 3 hydrogen atoms which are reactive toward isocyanate, for example triols such as 1,2,4-, 1,3,5-trihydroxycyclohexane, glycerol and trimethylolpropane or low molecular weight hydroxyl-comprising polyalkylene oxides based on ethylene oxide and/or 1,2-propylene oxide and the abovementioned triols as starter molecules.

If chain extenders d) are employed, they are advantageously used in amounts of from 1 to 60% by weight, preferably from 1.5 to 50% by weight and in particular from 2 to 40% by weight, based on the weight of the components (b) to (f).

As catalysts e) for producing polyurethane materials, preference is given to using compounds which strongly accelerate the reaction of the blowing agent with the compounds a) having isocyanate groups. Mention may be made of, for example, amidines, such as 2,3-dimethyl-3,4,5,6-tetrahydropyrimidine, tertiary amines, such as triethylamine, tributylamine, dimethylbenzylamine, N-methylmorpholine, N-ethylmorpholine, N-cyclohexylmorpholine, N,N,N',N'-tetramethylethylenediamine, N,N,N',N'-tetramethylbutanediamine, N,N,N',N'-tetramethylhexanediamine, pentamethyldiethylenetriamine, bis(dimethylaminoethyl)ether, urea, bis-(dimethylaminopropyl)urea, dimethylpiperazine, 1,2-dimethylimidazole, 1-azabicyclo[3,3,0]octane and preferably 1,4-diazabicyclo[2,2,2]octane and alkanolamine compounds such as triethanolamine, triisopropanolamine, N-methyldiethanolamine and N-ethyldiethanolamine and dimethylethanolamine, N,N-dimethylethanolamine, N,N-dimethylcyclohexylamine, bis(N,N-dimethylaminoethyl)ether, N,N,N',N',N''-pentamethyldiethylenetriamine, 1,4-diazabicyclo[2.2.2]octane, 2-(2-dimethylamino-ethoxy)ethanol, 2-((2-dimethylaminoethoxy)ethylmethylamino)ethanol, 1-(bis(3-dimethylamino)propyl)amino-2-propanol, N,N',N''tris(3-dimethylaminopropyl)hexa-hydrotriazine, bis(morpholinoethyl)ether, N,N-dimethylbenzylamine, N,N,N',N'',N''-pentamethyldipropylenetriamine, N,N'-diethylpiperazine. Further possible catalysts are organic metal compounds, preferably organic tin compounds, such as tin(II) salts of organic carboxylic acids, e.g. tin(II) acetate, tin(II) octoate, tin(II) ethylhexanoate and tin(II) laurate, and the dialkyltin(IV) salts of organic carboxylic acids, e.g. dibutyltin diacetate, dibutyltin dilaurate, dibutyltin maleate, dibutyltin mercaptide and dioctyltin diacetate, and also bismuth carboxylates such as bismuth(III) neodecanoate, bismuth 2-ethylhexanoate and bismuth octanoate or mixtures thereof, phenylmercury propionate, lead octoate, potassium acetate/octoate, quarternary ammonium formates and iron acetylacetonate. The organic metal compounds can be used either alone or preferably in combination with strongly basic amines.

Preference is given to using from 0.001 to 5% by weight, in particular from 0.05 to 2% by weight, of catalyst or catalyst combination, based on the weight of the components a) to d).

Auxiliaries and/or additives f) can also, if appropriate, be added to the reaction mixture for producing the polyurethane materials. Mention may be made of, for example, surface-active substances, foam stabilizers, cell regulators, further blowing agents, fillers, dyes, pigments, hydrolysis inhibitors, odor-absorbing substances and fungistatic and/or bacterio static substances.

Possible surface-active substances are, for example, compounds which serve to aid the homogenization of the starter materials and may also be suitable for regulating the cell structure. Mention may be made of, for example, emulsifiers such as the sodium salts of castor oil sulfates or of fatty acids and also salts of fatty acids with amines, e.g. diethanolamine oleate, diethanolamine stearate, diethanolamine ricinoleate, salts of sulfonic acids, e.g. akali metal or ammonium salts of dodecylbenzenesulfonic or dinaphthylmethanedisulfonic acid and ricinoleic acid; foam stabilizers such as siloxane-oxyalkylene copolymers and other organopolysiloxanes, ethoxylated alkylphenols, ethoxylated fatty alcohols, paraffin oils, castor oil or ricinoleic esters, Turkey red oil and peanut oil and cell regulators such as paraffins, fatty alcohols and dimethylpolysiloxanes. Oligomeric acrylates having polyoxyalkylene and fluoroalkane radicals as side groups are also suitable for improving the emulsifying action, the cell structure and/or for stabilizing the foam. The surface-active substances are usually used in amounts of from 0.01 to 5 parts by weight, based on 100 parts by weight of the components a) to d).

The polyurethane materials according to the invention are produced by the one-shot or prepolymer process with the aid of the low-pressure or high-pressure technique. The foams can be produced as slabstock foam or as molded foam. These processes are described, for example, in "The Polyurethanes Book" Randall and Lee, Eds, Wiley, 2002.

The invention is illustrated by the following examples.

EXAMPLES

A. Transfer of Unmodified Silicon Dioxide Nanoparticles into Polyols and Production of Stable Silicon Dioxide Dispersions Example A1

450 g of isopropanol, 450 g of n-propanol and 720 g of polyol 1 were added to 900 g of a commercially available acidic silica sol (Levasil® 200E/20% from H.C. Starck GmbH & Co KG, Leverkusen, Germany, particle diameter based on the BET method: 15 nm, pH 2.5, silicon dioxide concentration, 20% by weight). A mixture of water, isopropanol and n-propanol was removed over a period of 8 hours under reduced pressure and at a temperature which was increased stepwise from 30° C. to 75° C., with the temperature being 75° C. over the last 1-2 hours. This gave a stable, transparent silicon dioxide dispersion in the polyol having a silicon dioxide concentration of 20% by weight.

Example A2

400 g of a commercially available aqueous silica sol (Levasil® 200/30% from H.C. Starck GmbH & Co KG, Leverkusen, Germany, particle diameter based on the BET method: 15 nm, pH 9.0, silicon dioxide concentration, 30% by weight) were deionized to a pH of 2.1 by addition of DOWEX® MONOSPHERE® 650C (H) cation exchange resin. 333 g of the deionized silica sol were mixed with 333 g of isopropanol and 400 g of polyol 1. A water-isopropanol mixture was removed over a period of 8 hours under reduced pressure at a temperature which was increased stepwise from 30° C. to 75° C., with the temperature being 75° C. over the last 1-2 hours. This gave a stable, transparent silicon dioxide dispersion in the polyol having a silicon dioxide concentration of 20% by weight.

Example A3

500 g of a commercially available aqueous silica sol (Levasil® 100/45% from H.C. Starck GmbH & Co KG, Leverkusen, Germany, particle diameter based on the BET method: 30 nm, pH 10.0, silicon dioxide concentration: 45% by weight) were deionized to a pH of 2.1 by addition of DOWEX® MONOSPHERE® 650C (H) cation exchange resin. 444.4 g of the deionized silica sol were mixed with 222 g of isopropanol, 222 g of n-propanol and 800 g of polyol 1. A mixture of water, isopropanol and n-propanol was removed over a period of 8 hours under reduced pressure at a temperature which was increased stepwise from 30° C. to 75° C., with the temperature being 75° C. over the last 1-2 hours. This gave a stable, transparent silicon dioxide dispersion in the polyol having a silicon dioxide concentration of 20% by weight.

Example A4

700 g of a commercially available aqueous silica sol (Levasil® 300/30% from H.C. Starck GmbH & Co KG, Leverkusen, Germany, particle diameter based on the BET method: 9 nm, pH 10.0, silicon dioxide concentration: 30% by weight) were deionized to a pH of 2 by addition of DOWEX® MONOSPHERE® 650C (H) cation exchange resin. 666.7 g of the deionized silica sol were mixed with 300 g of isopropanol, 300 g of n-propanol and 1133.3 g of polyol 1. A mixture of water, isopropanol and n-propanol was removed over a period of 8 hours under reduced pressure at a temperature which was increased stepwise from 30° C. to 75° C., with the temperature being 75° C. over the last 1-2 hours. This gave a stable, transparent silicon dioxide dispersion in the polyol having a silicon dioxide concentration of 15% by weight.

Example A5

750 g of isopropanol, 750 g of n-propanol and 340 g of polyol 2 were added to 300 g of a commercially available acidic silica sol (Levasil® 200E/20% from H.C. Starck GmbH & Co KG, Leverkusen, Germany, particle diameter based on the BET method: 15 nm, pH 2.5, silicon dioxide concentration: 20% by weight). A mixture of water, isopropanol and n-propanol was removed over a period of 8 hours under reduced pressure and at a temperature which was increased stepwise from 30° C. to 75° C., with the temperature being 75° C. over the last 1-2 hours. This gave a stable, transparent silicon dioxide dispersion in the polyol having a silicon dioxide concentration of 15% by weight.

Example A6

1000 g of isopropanol, 500 g of n-propanol and 425 g of polyol 3 were added to 375 g of a commercially available acidic silica sol (Levasil® 200E/20% from H.C. Starck GmbH & Co KG, Leverkusen, Germany, particle diameter based on the BET method: 15 nm, pH 2.5, silicon dioxide concentration: 20% by weight). A mixture of water, isopropanol and n-propanol was removed under reduced pressure and at a temperature which was increased stepwise from 30° C. to 75° C. over a period of 8 hours, with the temperature being 75° C. over the last 1-2 hours. This gave a stable, transparent silicon dioxide dispersion in the polyol having a silicon dioxide concentration of 15% by weight.

Example A7

200 g of isopropanol, 200 g of n-propanol and 160 g of polyol 4 were added to 200 g of a commercially available acidic silica sol (Levasil® 200E/20% from H.C. Starck GmbH & Co KG, Leverkusen, Germany, particle diameter based on the BET method: 15 nm, pH 2.5, silicon dioxide concentration: 20% by weight). A mixture of water, isopropanol and n-propanol was separated off by distillation over a period of 6 hours under reduced pressure and a temperature which was increased stepwise from 30° C. to 75° C., with the temperature being 75° C. over the last 1-2 hours. This gave a stable, transparent silicon dioxide dispersion in the polyol having a silicon dioxide concentration of 20% by weight.

Example A8

100 g of isopropanol, 100 g of n-propanol and 226.7 g of polyol 5 were added to 200 g of a commercially available acidic silica sol (Levasil® 200E/20% from H.C. Starck GmbH & Co KG, Leverkusen, Germany, particle diameter based on the BET method: 15 nm, pH 2.5, silicon dioxide concentration: 20% by weight). A mixture of water, isopropanol and n-propanol was removed over a period of 6 hours under reduced pressure and at a temperature which was increased stepwise from 30° C. to 75° C., with the temperature being 75° C. over the last 1-2 hours. This gave a stable, transparent silicon dioxide dispersion in the polyol having a silicon dioxide concentration of 15% by weight.

Example A9

160 g of isopropanol and 160 g of polyol 6 were added to 200 g of a commercially available acidic silica sol (Levasil® 200E/20% from H.C. Starck GmbH & Co KG, Leverkusen, Germany, particle diameter based on the BET method: 15 nm, pH 2.5, silicon dioxide concentration: 20% by weight). A mixture of water and isopropanol was separated off by distillation over a period of 6 hours under reduced pressure and at a temperature which was increased stepwise from 30° C. to 75° C., with the temperature being 75° C. over the last 1-2 hours. This gave a stable, transparent silicon dioxide dispersion in the polyol having a silicon dioxide concentration of 20% by weight.

Example A10

100 g of isopropanol, 100 g of n-propanol and 40 g of polyol 7 were added to 200 g of a commercially available acidic silica sol (Levasil® 200E/20% from H.C. Starck GmbH & Co KG, Leverkusen, Germany, particle diameter based on the BET method: 15 nm, pH 2.5, silicon dioxide concentration: 20% by weight). A mixture of water, isopropanol and n-propanol was removed under reduced pressure and at a temperature which was increased stepwise from 30° C. to 75° C. over a period of 6 hours, with the temperature being 75° C. over the last 1-2 hours. This gave a stable, transparent silicon dioxide dispersion in the polyol having a silicon dioxide concentration of 50% by weight.

Example A11

1000 g of isopropanol, 1000 g of n-propanol and 583.3 g of polyol 8 were added to 1250 g of a commercially available acidic silica sol (Levasil® 200E/20% from H.C. Starck GmbH & Co KG, Leverkusen, Germany, particle diameter based on the BET method: 15 nm, pH 2.5, silicon dioxide concentration: 20% by weight). A mixture of water, isopropanol and n-propanol was removed under reduced pressure and at a temperature which was increased stepwise from 30° C. to 75° C. over a period of 8 hours, with the temperature being 75° C. over the last 1-2 hours. This gave a stable, transparent silicon dioxide dispersion in the polyol having a silicon dioxide concentration of 30% by weight.

B. Surface-Modification of Silicon Dioxide Nanoparticles in Polyols

The silicon dioxide concentration of the dispersion after surface-modification is based on pure silicon dioxide.

Example B1

In a 2 l glass flask equipped with a stirrer, 500 g of the silicon dioxide dispersion in polyol 1 from example A1 having a silicon dioxide concentration of 20% by weight, 214.3 g of polyol 1, 10.8 g (0.6 mol) of water and 27.2 g (0.2 mol) of methyltrimethoxysilane (from Merck Schuchardt OHG, Hohenbrunn, Germany) were mixed. The resulting mixture was stirred at 70° C. for 24 hours. After the mixture had been allowed to cool, volatile constituents were distilled off at 75° C. under reduced pressure over a period of 2 hours. This gave a stable, transparent silicon dioxide dispersion in the polyol having a silicon dioxide concentration of 14% by weight.

Example B2

In a 2 l glass flask equipped with a stirrer, 500 g of the silicon dioxide dispersion in polyol 1 from example A1 having a silicon dioxide concentration of 20% by weight, 214.3 g of polyol 1, 4 g (0.22 mol) of water and 13.2 g (0.11 mol) of dimethyldimethoxysilane (from Fluorochem, Old Glossop, Great Britain) were mixed. The resulting mixture was stirred at 70° C. for 24 hours. After the mixture had been allowed to cool, volatile constituents were distilled off at 75° C. under reduced pressure over a period of 2 hours. This gave a stable, transparent silicon dioxide dispersion in the polyol having a silicon dioxide concentration of 14% by weight.

Example B2b

In a 1 l glass flask equipped with a stirrer, 150 g of a commercially available acidic aqueous silica sol (Levasil® 200E/20% from H.C. Starck GmbH & Co KG, Leverkusen, Germany, particle diameter based on the BET method: 15 nm, pH 2.5, silicon dioxide concentration: 20% by weight), 75 g of isopropanol, 75 g of n-propanol and 170 g of polyol 1 were mixed. 4.8 g (0.04 mol) of dimethyldimethoxysilane (from Fluorochem, Old Glossop, Great Britain) were then added and the resulting mixture was stirred at room temperature for 24 hours. A water/isopropanol/n-propanol mixture and further volatile constituents were removed by distillation over a period of 4 hours under reduced pressure and at a temperature which was increased stepwise from 30° C. to 75° C., with the temperature being 75° C. over the last 1-2 hours. This gave a stable, transparent silicon dioxide dispersion in the polyol having a silicon dioxide concentration of 15% by weight.

Example B3

In a 2 l glass flask equipped with a stirrer, 750 g of a silicon dioxide dispersion in polyol 1 from example A1 having a silicon dioxide concentration of 20% by weight, 500 g of polyol 1, 8.9 g (0.5 mol) of water and 82.4 g (0.16 mol) of a 62% strength by weight ethanolic solution of bis(2-hydroxyethyl)-3-aminopropyltriethoxysilane (from ABCR GmbH & Co KG, Karlsruhe, Germany) were mixed. The resulting mixture was stirred at room temperature for 24 hours. After evaporation of volatile constituents under reduced pressure at 75° C. over a period of 2 hours, a stable, transparent silicon dioxide dispersion in the polyol having a silicon dioxide concentration of 12% by weight was obtained.

Example B4

In a 2 l glass flask equipped with a stirrer, 300 g of the silicon dioxide dispersion in polyol 1 from example A1 having a silicon dioxide concentration of 20% by weight, 300 g of polyol 1 and 8.8 g (0.04 mol) of 3-aminopropyltriethoxysilane (from Merck Schuchardt OHG, Hohenbrunn, Germany) were mixed. The resulting mixture was stirred at 70° C. for 24 hours. After the mixture had been allowed to cool, volatile constituents were removed at 75° C. under reduced pressure over a period of 2 hours, giving a stable, transparent silicon dioxide dispersion in the polyol having a silicon dioxide concentration of 10% by weight.

Example B5

In a 2 l glass flask equipped with a stirrer, 300 g of the silicon dioxide dispersion in polyol 1 from example A1 having a silicon dioxide concentration of 20% by weight, 300 g of polyol 1 and 12.9 g (0.07 mol) of 3-mercaptopropyltrimethoxysilane (from Merck Schuchardt OHG, Hohenbrunn, Germany) were mixed. The resulting mixture was stirred at 70° C. for 24 hours. After the mixture had been allowed to cool, volatile constituents were removed at 75° C. under reduced pressure over a period of 2 hours, giving a stable, transparent silicon dioxide dispersion in the polyol having a silicon dioxide concentration of 10% by weight.

Example B6

In a 1 l glass flask equipped with a stirrer, 440.7 g of a silicon dioxide dispersion in polyol 1 from example A1 having a silicon dioxide concentration of 20% by weight, 90 g of polyol 1 and 55 g (0.023 mol) of a triethoxysilane functionalized with a hyperbranched polyol (HBP-silane) were mixed. The resulting mixture was stirred at room temperature for 24 hours. Volatile constituents were removed at 75° C. under reduced pressure over a period of 2 hours, giving a stable, transparent silicon dioxide dispersion in the polyol having a silicon dioxide content of 16.6% by weight. The triethoxysilane functionalized with a hyperbranched polyol was obtained by reaction of 11.07 g (0.05 mol) of 3-aminopropyltriethoxysilane and 8.71 g (0.05 mol) of 2,4-diisocyanato-1-methylbenzene (2,4-TDI) in 700 ml of dichloromethane at room temperature for a period of 1 hour. 97 g (0.05 mol) of a hyperbranched polyol (Mw=1940 g/mol) and a catalytic amount of dibutyltin dilaurate were then added, the resulting mixture was stirred at room temperature for 24 hours and dichlormethane was separated off under reduced pressure.

Example B7

In a 2 l glass flask equipped with a stirrer, 600 g of a silicon dioxide dispersion in polyol 1 having a silicon dioxide concentration of 20% by weight from example A1, 200 g of polyol 1 and 53.5 g (0.06 mol) of trimethoxysilane (obtainable by reaction of 3-(2,3-epoxypropoxy)propyltrimethoxysilane and Jeffamine XTJ-505) were mixed. The resulting mixture was stirred at room temperature for 24 hours. Volatile constituents were separated off at 75° C. under reduced pressure over a period of 2 hours, giving a stable, transparent silicon dioxide dispersion in the polyol having a silicon dioxide concentration of 15% by weight. To prepare the silane, 28.3 g (0.12 mol) of 3-(2,3-epoxypropoxy)propyltrimethoxysilane (from Merck Schuchardt OHG, Hohenbrunn, Germany) and 71.7 g (0.12 mol) of Jeffamine XTJ-505 (from Huntsman) were mixed and stirred overnight at 60° C.

Example B8

In a 3 l glass flask equipped with a stirrer, 1000 g of the silicon dioxide dispersion in polyol 1 from example A1 having a silicon dioxide concentration of 20% by weight, 818 g of polyol 1 and 59.3 g (0.27 mol) of N-(3-(trimethoxysilyl)propyl)ethylenediamine (Z6020 from Dow Corning) were mixed. The resulting mixture was stirred at 70° C. for 24 hours. After the mixture had been allowed to cool, volatile constituents were removed at 75° C. under reduced pressure over a period of 2 hours, giving a stable, transparent silicon dioxide dispersion in the polyol having a silicon dioxide concentration of 11% by weight.

Example B9

In a 1 l glass flask equipped with a stirrer, 150 g of the silicon dioxide dispersion in polyol 1 from example A1 having a silicon dioxide concentration of 20% by weight, 50 g of polyol 1, 1.80 g (0.10 mol) of water, 2.72 g (0.02 mol) of methyltrimethoxysilane (from Merck Schuchardt OHG, Hohenbrunn, Germany) and 2.40 g (0.02 mol) of dimethyldimethoxysilane (from Fluorochem, Old Glossop, Great Britain) were mixed. The resulting mixture was stirred at 70° C. for 24 hours. After the mixture had been allowed to cool, volatile constituents were distilled off at 75° C. under reduced pressure over a period of 2 hours. This gave a stable, transparent silicon dioxide dispersion in the polyol having a silicon dioxide concentration of 15% by weight.

Example B10

In a 1 l glass flask equipped with a stirrer, 150 g of the silicon dioxide dispersion in polyol 1 from example A1 having a silicon dioxide concentration of 20% by weight, 50 g of polyol 1, 0.8 g (0.04 mol) of water and 2.04 g (0.015 mol) of methyltrimethoxysilane (from Merck Schuchardt OHG, Hohenbrunn, Germany) were mixed and stirred at room temperature for 15 minutes. 3.32 g (0.015 mol) of aminopropyltriethoxysilane (from Merck Schuchardt OHG, Hohenbrunn, Germany) were added to this mixture. The resulting mixture was stirred at room temperature for 24 hours and volatile constituents were then distilled off at 75° C. under reduced pressure over a period of 2 hours. This gave a stable, transparent silicon dioxide dispersion in the polyol having a silicon dioxide concentration of 15% by weight.

C. Alteration of the pH of the Silicon Dioxide-Polyol Dispersions

Example C1

Alteration of the pH of the Silicon Dioxide Dispersions Using a 20% Strength Solution of Sodium Ethoxide in Ethanol In a 2 l glass flask equipped with a stirrer, 1100 g of the silicon dioxide dispersion in polyol 1 having a silicon dioxide concentration of 20% by weight from example A1 were mixed with 471 g of polyol 1, giving a 14% strength silicon dioxide dispersion in the polyol (mixing of 3 g of this dispersion with 17 g of deionized water resulted in a pH of 4.3, and addition of 0.4 g of a 0.1% strength cresol red solution in ethanol as acid-base indicator to the mixture brought about a change in color to yellow). 4.4 g of a 20% strength solution of sodium ethoxide in ethanol (from Merck Schuchardt OHG, Hohenbrunn, Germany) were added, the resulting mixture was stirred at room temperature for 30 minutes and ethanol was separated off at 75° C. under reduced pressure. This gave a stable, transparent silicon dioxide-polyol dispersion having a silicon dioxide concentration of 14% by weight. Mixing of 3 g of the dispersion with 17 g of deionized water resulted in a pH of 8.9, and addition of 0.4 g of a 0.1% strength ethanolic solution of cresol red (as acid-base indicator) to the mixture brought about a change in color to red. pH values were determined using a Hanna Instruments HI 221 pH meter equipped with an HI 1131 pH electrode.

Example C2

Surface Modification of the Sample from Example C1

In a 2 l glass flask equipped with a stirrer, 785 g of the silicon dioxide dispersion in polyol 1 having a silicon dioxide concentration of 14% by weight and a pH of 8.9 from example C1, 4.3 g (0.24 mol) of water and 14.5 g (0.12 mol) of dimethyldimethoxysilane (from Fluorochem, Old Glossop, Great Britain) were mixed. The resulting mixture was stirred at 70° C. for 24 hours. After the mixture had been allowed to cool, volatile constituents were removed at 75° C. under reduced pressure over a period of 2 hours. This gave a stable, transparent silicon dioxide-polyol dispersion having a silicon dioxide concentration of 14% by weight. Mixing of 3 g of the dispersion with 17 g of deionized water resulted in a pH of 9.5, and addition of 0.4 g of a 0.1% strength ethanolic cresol red solution (as acid-base indicator) to the mixture brought about a change in color to red. pH values were determined using a Hanna Instruments HI 221 pH meter equipped with an HI 1131 pH electrode.

Example C3

Surface-Modification in the Polyol and Subsequent Alteration of the pH

In a 2 l glass flask equipped with a stirrer, 550 g of silicon dioxide dispersion in polyol 1 having a silicon dioxide concentration of 20% by weight from example A1, 235.7 g of polyol 1, 4.3 g (0.23 mol) of water and 14.5 g (0.12 mol) of dimethyldimethoxysilane (from Fluorochem, Old Glossop, Great Britain) were mixed. The resulting mixture was stirred at 70° C. for 24 hours. Mixing of 3 g of the dispersion with 17 g of deionized water resulted in a pH of 4.6, and addition of 0.4 g of a 0.1% strength ethanolic cresol red solution as acid-base indicator to the mixture brought about a change in color to yellow. After the mixture had been allowed to cool, 2.2 g of a 20% strength ethanolic solution of sodium ethoxide (from Merck Schuchardt OHG, Hohenbrunn, Germany) were added. After stirring for 30 minutes, volatile constituents were removed at 75° C. under reduced pressure over a period of 2 hours. This gave a stable, transparent silicon dioxide-polyol dispersion having a silicon dioxide concentration of 14% by weight. Mixing of 3 g of the dispersion with 17 g of deionized water resulted in a pH of 10.2, and addition of 0.4 g of a 0.1% strength ethanolic cresol red solution (as acid-base indicator) to the mixture brought about a change in color to red. pH values were determined using a Hanna Instruments HI 221 pH meter equipped with an HI 1131 pH electrode.

D. Surface-Modification of Silicon Dioxide Nanoparticles in Water-Solvent and Transfer of the Modified Silicon Dioxide Particles into the Polyol Example D1

In a 2 l glass flask equipped with a stirrer, 500 g of a commercially available aqueous acidic silica sol (Levasil® 200E/20% from H.C. Starck GmbH & Co KG, Leverkusen, Germany, particle diameter based on the BET method: 15 nm, pH 2.5, silicon dioxide concentration: 20% by weight), 250 g of isopropanol and 250 g of n-propanol are mixed. 15 g (0.11 mol) of methyltrimethoxysilane (from Merck Schuchardt OHG, Hohenbrunn, Germany) were then added and the resulting mixture was stirred at room temperature for 24 hours. After silinazation was complete, 400 g of polyol 1 were added and, after stirring, water, isopropanol, n-propanol and further volatile constituents were separated off over a period of 8 hours under reduced pressure and at a temperature which was increased stepwise from 30° C. to 75° C., with the temperature being 75° C. over the last 1-2 hours. This gave a stable, transparent silicon dioxide-polyol dispersion having a silicon dioxide concentration of 20% by weight.

Example D2

500 g of a commercially available aqueous silica sol (Levasil® 200/30% from H.C. Starck GmbH & Co KG, Leverkusen, Germany, particle diameter based on the BET method: 15 nm, pH 9.0, silicon dioxide concentration: 30% by weight) were deionized to a pH of 2.1 by addition of DOWEX® MONOSPHERE® 650C (H) cation exchange resin. 400 g of the deionized silica sol were mixed with 200 g of isopropanol and 200 g of n-propanol. 18 g (0.13 mol) of methyltrimethoxysilane (from Merck Schuchardt OHG, Hohenbrunn, Germany) were then added and the resulting mixture was stirred at room temperature for 24 hours. After silinazation was complete, 480 g of polyol 1 were added and, after stirring, water, isopropanol, n-propanol and further volatile constituents were separated off over a period of 8 hours under reduced pressure and at a temperature which was increased stepwise from 30° C. to 75° C., with the temperature being 75° C. over the last 1-2 hours. This gave a stable, transparent silicon dioxide-polyol dispersion in the polyol having a silicon dioxide concentration of 20% by weight.

Example D3

In a 1 l glass flask equipped with a stirrer, 250 g of a commercially available acidic aqueous silica sol (Levasil® 200E/20% from H.C. Starck GmbH & Co KG, Leverkusen, Germany, particle diameter based on the BET method: 15 nm, pH 2.5, silicon dioxide concentration: 20% by weight) and 250 g of isopropanol were mixed. 21.5 g (0.026 mol) of trimethoxysilane (obtained by reaction of 3-(2,3-epoxypropoxy)propyltrimethoxysilane and Jeffamine XTJ-505) were then added and the resulting mixture was stirred at room temperature for 24 hours. After silinazation was complete, 450 g of polyol 1 were added and, after stirring, water, isopropanol and further volatile constituents were separated off over a period of 6 hours under reduced pressure and at a temperature which was increased stepwise from 30° C. to 75° C., with the temperature being 75° C. over the last 1-2 hours. This gave a stable, transparent silicon dioxide-polyol dispersion having a silicon dioxide concentration of 10% by weight. Synthesis of the silane: 28.3 g (0.12 mol) of 3-(2,3-epoxypropoxy)propyltrimethoxysilane (from Merck Schuchardt OHG, Hohenbrunn, Germany) and 71.7 g (0.12 mol) of Jeffamine XTJ-505 (from Huntsman) were mixed and stirred overnight at 60° C.

E. Mechanical Properties of the Polyurethane Elastomers Reinforced by the Silicon Dioxide Nanoparticles The production of specimens for mechanical testing was carried out by methods customary in the polyurethane industry. The starting materials used for producing the polymer materials in the examples are shown in Tables 1a-b.

The isocyanate was added to the well-mixed and homogenized blend of polyol with silicon dioxide particles and other starter materials for the polyurethane formulation. The formulations were poured into an open mold, allowed to react and cured at 50° C. to give a plate having dimensions of 200×150×5 mm. The material obtained was heated at 60° C. for 24 hours and the mechanical properties were determined on corresponding test specimens which had been cut out from the middle part of the plate. The finished polyurethane comprised from 1.5 to 9.8% by weight of $SiO_2$. The measurements were carried out using the test methods customary for the testing of polyurethane polymers.

Example E1

Production of Polyurethane Elastomers—Reference Example

A mixture of 0.94 g of a silicone-comprising surfactant (Tegostab® B4113), 1.06 g of a 33% strength by weight solution of 1,4-diazabicyclo[2.2.2]octane in TEG (Dabco® 33LV) and 14.08 g of K—Ca—Na-zeolite paste was added to 210.7 g of polyol 1 and 8.4 g of 1,4-butanediol. The resulting mixture was mixed in a high-speed mixer for 1 minute and then left to stand at room temperature for 30 minutes. 64.8 g of a commercial MDI prepolymer for flexible elastomers and molded flexible foams having an NCO content of 23% (Lupranat® MP 102) were added and, after stirring for 1 minute in a high-speed mixer, poured into an open mold, allowed to react and cured at 50° C. to give a plate having dimensions of 200×150×5 mm. The material obtained was heated at 60° C. for 24 hours and the mechanical properties were determined on corresponding test specimens which had been cut from the middle part of the plate.

Example E2-3 (see Table 2)

Production of a Polyurethane Elastomer Comprising Silicon Dioxide Nanoparticles 126.1 g of the dispersion of modified silicon dioxide nanoparticles in polyol 1 having a silicon dioxide concentration of 14% by weight from example B1, 89.8 g of polyol 1 and 7.95 g of 1,4-butanediol were mixed and 0.88 g of Tegostab® B4113, 0.99 g of Dabco® 33LV and 13.25 g of K—Ca—Na-zeolite paste were added to this mixture. The resulting mixture was homogenized in a high-speed mixer for 1 minute and then left to stand at room temperature for 30 minutes. 61 g of Lupranat® MP 102 were added (resulting in an isocyanate index of 105) and, after stirring for 1 minute in a high-speed mixer, the mixture was poured into an open mold, allowed to react and cured at 50° C. to give plates having dimensions of 200×150×5 mm. The material obtained was heated at 60° C. for 24 hours and the mechanical properties were determined on corresponding test specimens which had been cut from the middle part of the plate. The finished polyurethane comprised 5.9% by weight of $SiO_2$.

Further elastomers were produced in a similar way using various particle concentrations in the elastomer. This was achieved by use of smaller amounts of the concentrated polyol-particle blend and larger amounts of the pure carrier polyol (see examples E2-1 to E2-4), with the dispersion from B1 being used as concentrated polyol-particle blend. Further elastomers were produced in a similar way using particles having different surface modifications and using particles modified by different methods.

In examples E3-1 to E3-5, a concentrated polyol-particle blend from example B2 was used; in examples E4-1 to E4-4, a concentrated polyol-particle blend from example B3 was used; in examples E5-1 to E5-5, a concentrated polyol-particle blend from example B4 was used; in examples E6-1 to E6-3, a concentrated polyol-particle blend from example B6 was used; in examples E7-1 to E7-4, a concentrated polyol-particle blend from example D1 was used; and in examples E8-1 to E8-2, a concentrated polyol-particle blend from example D3 was used.

TABLE 1a

Polyols

| Polyol | Structure | OH-number | EO-content |
|---|---|---|---|
| Polyol 1 | GLY-PO-EO | 28 | 14.0 |
| Polyol 2 | PTHF | 112 | 0.0 |
| Polyol 3 | PG-PO | 28 | 0.0 |
| Polyol 4 | PG-PO-EO | 29 | 18.5 |
| Polyol 5 | GLY-PO-EO/PO-EO | 42 | 72.5 |
| Polyol 6 | GLY-PO | 400 | 0.0 |
| Polyol 7 | GLY-PO | 805 | 0.0 |
| Polyol 8 | DPG-PO-EO | 63 | 25.0 |

GLY = glycerol,
EO = ethylene oxide,
PO = propylene oxide,
DPG = dipropylene glycol TABLE 1b Isocyanates and additives

| Trade name | Manufacturer |
|---|---|
| 1,4-butanediol | BASF |
| Lupranat MP 102 | BASF |
| Isocyanate 1 | BASF |
| Tegostab B 4113 | Goldschmidt |
| Tegostab B 8680 | Goldschmidt |
| K—Ca—Na zeolite paste | UOP |
| Dabco 33 LV | Air products |
| Niax A1 | Momentive |
| Jeffamine XTJ-505 | Huntsman |

TABLE 1c

Silica sols

| Name | Manufacturer | Particle size (ca. nm) | $SiO_2$ (wt %) | Surface area ($m^2$/g) | pH |
|---|---|---|---|---|---|
| Levasil 100/45% | H.C. Starck | 30 | 45 | 100 | 10.0 |
| Levasil 200/30% | H.C. Starck | 15 | 30 | 200 | 9.0 |
| Levasil 200A/40% | H.C. Starck | 15 | 40 | 200 | 10.0 |
| Levasil 200E/20% | H.C. Starck | 15 | 20 | 200 | 2.5 |
| Levasil 300/30% | H.C. Starck | 9 | 30 | 300 | 10.0 |

TABLE 1d

Silanes

| Substance | Manufacturer | Formula | Molecular weight |
|---|---|---|---|
| Methyltrimethoxysilane | Merck | $CH_3(CH_3O)_3Si$ | 136.22 |
| Dimethyldimethoxysilane | Fluorochem | $(CH_3)_2(CH_3O)_2Si$ | 120.22 |
| Bis(2-hydroxyethyl)-3-aminopropyltriethoxysilane | ABCR | $(C_2H_4OH)_2NC_3H_6(C_2H_5O)_3Si$ | 309.48 |
| Aminopropyltriethoxysilane | Merck | $NH_2C_3H_6(C_2H_5O)_3Si$ | 221.37 |
| 3-Mercaptopropyl-trimethoxysilane | Merck | $SHC_3H_6(CH_3O)_3Si$ | 196.34 |
| 3-(2,3-Epoxypropoxy)propyl-trimethoxysilane | Merck | $CH_3(C_2H_2O)OC_3H_6(CH_3O)_3Si$ | 236.34 |
| N-(3-(Trimethoxy-silyl)propyl)ethylenediamine | Dow Corning | $NH_2C_2H_4NHC_3H_6(CH_3O)_3Si$ | 222.36 |

TABLE 2a

| Example | SiO₂ content of the pourable elastomer [%] | Open time [min] | Density [g/cm³] | Shore A hardness | Tensile strength [MPa] | Elongation at break [%] | Tear propagation resistance [kN/m] | Abbrasion [mm³] |
|---|---|---|---|---|---|---|---|---|
| E1   | 0   | 4.5  | 1.092 | 61 | 4 | 220 | 6  | 473 |
| E2-1 | 1.5 | 4.5  | 1.101 | 60 | 4 | 230 | 6  | 341 |
| E2-2 | 3.7 | 5.0  | 1.115 | 62 | 5 | 290 | 7  | 267 |
| E2-3 | 5.9 | 5.5  | 1.130 | 60 | 7 | 340 | 7  | 228 |
| E2-4 | 7.9 | 6.0  | 1.141 | 61 | 7 | 350 | 8  | 201 |
| E3-1 | 1.5 | 4.5  | 1.100 | 61 | 4 | 210 | 7  | 350 |
| E3-2 | 3.7 | 5.5  | 1.113 | 61 | 4 | 230 | 7  | 284 |
| E3-3 | 5.9 | 6.0  | 1.119 | 62 | 4 | 230 | 7  | 248 |
| E3-4 | 7.9 | 6.5  | 1.130 | 61 | 5 | 270 | 8  | 217 |
| E3-5 | 9.8 | 6.5  | 1.149 | 60 | 5 | 280 | 8  | 201 |
| E4-1 | 1.5 | 4.0  | 1.095 | 61 | 4 | 210 | 6  | 353 |
| E4-2 | 3.7 | 5.0  | 1.113 | 59 | 4 | 260 | 7  | 319 |
| E4-3 | 5.9 | 4.5  | 1.122 | 57 | 5 | 330 | 9  | 255 |
| E4-4 | 7.9 | 2.5  | 1.129 | 53 | 6 | 380 | 9  | 310 |
| E5-1 | 1.5 | 4.0  | 1.097 | 61 | 4 | 250 | 6  | 379 |
| E5-2 | 3.7 | 4.0  | 1.111 | 62 | 4 | 190 | 7  | 300 |
| E5-3 | 5.9 | 4.5  | 1.124 | 62 | 5 | 220 | 7  | 260 |
| E5-4 | 7.9 | 3.5  | 1.140 | 61 | 7 | 290 | 7  | 188 |
| E6-1 | 1.5 | 4.0  | 1.097 | 61 | 4 | 220 | 6  | 406 |
| E6-2 | 3.7 | 5.0  | 1.108 | 62 | 5 | 240 | 7  | 372 |
| E6-3 | 5.9 | 5.0  | 1.106 | 61 | 4 | 170 | 7  | 319 |
| E7-1 | 1.5 | 4.5  | 1.099 | 60 | 4 | 240 | 7  | 336 |
| E7-2 | 3.7 | 5.5  | 1.111 | 58 | 4 | 240 | 7  | 267 |
| E7-3 | 5.9 | 6.0  | 1.126 | 58 | 4 | 230 | 7  | 234 |
| E7-4 | 7.9 | 6.5  | 1.138 | 57 | 4 | 270 | 8  | 218 |
| E8-1 | 3.5 | 5.5  | 1.113 | 59 | 6 | 320 | 7  | 281 |
| E8-2 | 7.0 | 11.0 | 1.118 | 51 | 4 | 270 | 11 | 288 |

F. Mechanical Properties of Polyurethane Foams Reinforced by Silicon Dioxide Nanoparticles The production of specimens for mechanical testing was carried out using methods customary in the polyurethane industry. The starting materials used for producing the polymer materials in the examples are shown in Tables 1a-b.

The isocyanate was added to the well-mixed and homogenized blend of polyol comprising silicon dioxide particles and other starting materials for the polyurethane formulation. The formulations were poured into an open mold, allowed to react and cured at room temperature. The mechanical properties were determined on test specimens which had been cut from the middle of the foam block, in accordance with standard test methods. The polyurethane foams obtained in this way comprised from 2.0 to 3.9% by weight of $SiO_2$.

Example F1

Production of a Flexible Foam—Reference Example 0.46 g of Tegostab® B4113, 0.46 g of a silicone-comprising surfactant (Tegostab® B8680), 1.53 g of Dabco® 33LV and 0.46 g of a 70% strength by weight solution of bis(N,N-dimethylaminoethyl)ether in DPG (Niax® A1) as catalyst were added to 306.2 g of polyol 1. The blend obtained was mixed by means of a laboratory stirrer. 9.19 g of water were added. The mixture was homogenized for 1 minute by means of a laboratory stirrer and then left to stand at room temperature for 30 minutes. 131.7 g of isocyanate 1 (a mixture of 4,4'-MDI, 2,4'-MDI and polymeric MDI in a ratio of 42.0/21.0/37.0 having an NCO value of 31.3% and Fn=2.25) were added. After stirring for 10 seconds by means of a laboratory stirrer at 1500 rpm, the mixture was poured into an open mold, allowed to react and cured at room temperature, giving a 6 l foam block. After complete curing at room temperature over a period of 24 hours, the foam was removed from the mold and the mechanical properties were determined.

Example F2

Production of a Flexible Foam Comprising Silicon Dioxide Nanoparticles 176 g of the silanized silicon dioxide dispersion in polyol 1 having a silicon dioxide concentration of 10% by weight from example B4 and 134.9 g of polyol 1 were mixed and 0.44 g of Tegostab® B4113, 0.44 g of Tegostab® 88680, 2.05 g of Dabco® 33LV and 0.44 g of Niax® A1 were added to this blend. The blend obtained was mixed by means of a laboratory stirrer. 8.8 g of water were added. The mixture was homogenized by means of a laboratory stirrer for 1 minute and then left to stand at room temperature for 30 minutes. 126.9 g of isocyanate 1 were added and, after stirring for 10 seconds by means of a laboratory stirrer at 1500 rpm, the mixture was poured into an open mold, allowed to react and cured at room temperature, giving a 6 l foam block. After complete curing at room temperature over a period of 24 hours, the foam was removed from the mold and the mechanical properties were determined. The finished polyurethane foam comprised 3.9% by weight of $SiO_2$.

As can be seen from Table 3, the compressive deformation values are improved by addition of the silicon dioxide.

TABLE 3

| | Unit | F1 | F2 |
|---|---|---|---|
| Cream time | s | 8 | 9 |
| Fiber time | s | 47 | 47 |
| Rise time | s | 85 | 83 |
| Compressive strength at 25% compression | kPa | 1.9 | 2.3 |
| Compressive strength at 40% compression | kPa | 2.5 | 3.1 |

TABLE 3-continued

|  | Unit | F1 | F2 |
|---|---|---|---|
| Compressive strength at 65% compression | kPa | 6.3 | 8.1 |
| Hysteresis 70% | % | 26.4 | 27.7 |
| Density | kg/m$^3$ | 41.6 | 45.6 |
| Compression set 50% | % | 4.6 | 3.9 |
| Tensile strength | kPa | 137 | 145 |
| Elongation at break | % | 121 | 117 |
| Air permeability | dm$^3$/s | 1.04 | 1.00 |
| Compression set under humid conditions | % | 15.1 | 11.5 |
| Rebound resilience | % | 56 | 56 |
| Tear propagation resistance | N/mm | 0.53 | 0.56 |
| Compression set 75% | % | 8.1 | 6.1 |
| Compression set after storage under hot and humid conditions, 1 cycle | % | 11.3 | 9.8 |
| Compression set after storage under hot and humid conditions, 3 cycles | % | 14.6 | 11.8 |

Example F3

Preparation of Prepolymers 775.7 g of isocyanate 1 were mixed with 224.3 g of the silicon dioxide dispersion in polyol 1 from example B1 having a silicon dioxide concentration of 14% by weight. The resulting mixture was stirred at 80° C. for 3 hours, giving a stable silicon dioxide dispersion in the prepolymer having a silicon dioxide concentration of 3.1% by weight. The prepolymer can be used for producing flexible foam.

COMPARATIVE EXAMPLES

Example G1

300 g of a commercially available acidic aqueous silica sol (Levasil® 200E/20% from H.C. Stark GmbH & Co KG, Leverkusen, Germany, particle diameter based on the BET method: 15 nm, pH 2.5, silicon dioxide concentration: 20% by weight) and 300 g of isopropanol were mixed. After slow addition of 32.9 g of a 62% strength ethanolic solution of bis(2-hydroxyethyl)-3-aminopropyltriethoxysilane (from ABCR GmbH & Co KG, Karlsruhe, Germany), a gel-like product was obtained.

Example G2

50 g of a commercially available acidic aqueous silica sol (Levasil® 200E/20% from H.C. Stark GmbH & Co KG, Leverkusen, Germany, particle diameter based on the BET method: 15 nm, pH 2.5, silicon dioxide concentration: 20% by weight) and 360 g of isopropanol were mixed. After slow addition of 5.5 g of a 62% strength ethanolic solution of bis(2-hydroxyethyl)-3-aminopropyltriethoxysilane (from ABCR GmbH & Co KG, Karlsruhe, Germany), a gel-like product was obtained.

Example G3

300 g of a commercially available acidic aqueous silicon dioxide sol (Levasil® 200E/20% from H.C. Stark GmbH & Co KG, Leverkusen, Germany, particle diameter based on the BET method: 15 nm, pH 2.5, silicon dioxide concentration: 20% by weight) were diluted with 300 g of water to a silicon dioxide content of 10% by weight. After slow addition of 32.9 g of a 62% strength ethanolic solution of bis(2-hydroxyethyl)-3-aminopropyltriethoxysilane (from ABCR GmbH & Co KG, Karlsruhe, Germany), a gel-like product was obtained.

Example G4

200 g of a commercially available, alkali-stabilized, aqueous silica sol (Levasil® 200/30% from H.C. Stark GmbH & Co KG, Leverkusen, Germany, particle diameter based on the BET method: 15 nm, pH 9.0, silicon dioxide concentration: 30% by weight) were diluted with 130 g of water and 270 g of isopropanol to a silicon dioxide content of 10% by weight. After slow addition of 32.9 g of a 62% strength ethanolic solution of bis(2-hydroxyethyl)-3-aminopropyltriethoxysilane (from ABCR GmbH & Co KG, Karlsruhe, Germany) a gel-like product was obtained.

Example G5

200 g of a commercially available, alkali-stabilized, aqueous silica sol (Levasil® 200/30% from H.C. Stark GmbH & Co KG, Leverkusen, Germany, particle diameter based on the BET method: 15 nm, pH 9.0, silicon dioxide concentration: 30% by weight) were diluted with 400 g of water to a silicon dioxide content of 10% by weight. 32.9 g of a 62% strength ethanolic solution of bis(2-hydroxyethyl)-3-aminopropyltriethoxysilane (from ABCR GmbH & Co KG, Karlsruhe, Germany) were slowly added and the resulting solution was stirred at room temperature for 24 hours. Due to gel formation, neither direct transfer into polyol 1 nor mixing with isopropanol and subsequent transfer into polyol 1 was possible.

Example G6

200 g of a commercially available, alkali-stabilized, aqueous silica sol (Levasil® 200/30% from H.C. Stark GmbH & Co KG, Leverkusen, Germany, particle diameter based on the BET method: 15 nm, pH 9.0, silicon dioxide concentration: 30% by weight) were diluted with 400 g of water to a silicon dioxide content of 10% by weight. 32.9 g of a 62% strength ethanolic solution of bis(2-hydroxyethyl)-3-aminopropyltriethoxysilane (from ABCR GmbH & Co KG, Karlsruhe, Germany) were slowly added and the resulting solution was stirred at room temperature for 24 hours, then deionized to a pH of 4 by addition of DOWEX® MONOSPHERE® 650C (H) cation exchange resin. The deionized silica sol was mixed with 540 g of isopropanol and 540 g of polyol 1. Evaporation of the water-isopropanol mixture at 75° C. under reduced pressure gave a gel-like product.

Example G7

200 g of a commercially available, alkali-stabilized, aqueous silica sol (Levasil® 200/30% from H.C. Stark GmbH & Co KG, Leverkusen, Germany, particle diameter based on the BET method: 15 nm, pH 9.0, silicon dioxide concentration: 30% by weight) were diluted with 400 g of water to a silicon dioxide content of 10% by weight. After addition of 14.6 g of 3-aminopropyltriethoxysilane (from Merck Schuchardt OHG, Hohenbrunn, Germany) a gel was obtained.

Example G8

200 g of a commercially available, alkali-stabilized, aqueous silica sol (Levasil® 200/30% from H.C. Stark GmbH & Co KG, Leverkusen, Germany, particle diameter based on the BET method: 15 nm, pH 9.0, silicon dioxide concentration: 30% by weight) were diluted with 400 g of water to a silicon dioxide content of 10% by weight. 8.9 g of 3-aminopropyltriethoxysilane (from Merck Schuchardt OHG, Hohenbrunn, Germany) were slowly added and the resulting solution was stirred at room temperature for 18 hours. Due to gel formation, neither direct transfer into polyol 1 nor transfer into polyol 1 after mixing with isopropanol was possible.

Example G9

200 g of a commercially available, alkali-stabilized, aqueous silica sol (Levasil® 200/30% from H.C. Stark GmbH & Co KG, Leverkusen, Germany, particle diameter based on the BET method: 15 nm, pH 9.0, silicon dioxide concentration: 30% by weight) were diluted with 400 g of water to a silicon dioxide content of 10% by weight. 8.9 g of 3-aminopropyltriethoxysilane (from Merck Schuchardt OHG, Hohenbrunn, Germany) were slowly added and the resulting solution was stirred at room temperature for 18 hours. After addition of DOWEX® MONOSPHERE® 650C (H) cation exchange resin, the silanized sol quickly became gel-like.

Example G10

100 g of a commercially available, alkali-stabilized, aqueous silica sol (Levasil® 200/30% from H.C. Stark GmbH & Co KG, Leverkusen, Germany, particle diameter based on the BET method: 15 nm, pH 9.0, silicon dioxide concentration: 30% by weight) were diluted with 120 g of methanol. 6.6 g of 3-aminopropyltriethoxysilane (from Merck Schuchardt OHG, Hohenbrunn, Germany) were dissolved in 100 g of methanol and the resulting solution was slowly added at a rate of 10 g/h to the diluted sol. After the addition was complete, the solution was stirred at room temperature for a further 5 hours. After addition of DOWEX® MONOSPHERE® 650C (H) cation exchange resin, the already turbid silanized sol quickly became gel-like.

Example G11

100 g of a commercially available, alkali-stabilized, aqueous silica sol (Levasil® 200/30% from H.C. Stark GmbH & Co KG, Leverkusen, Germany, particle diameter based on the BET method: 15 nm, pH 9.0, silicon dioxide concentration: 30% by weight) were diluted with 120 g of methanol. 6.6 g of 3-aminopropyltriethoxysilane (from Merck Schuchardt OHG, Hohenbrunn, Germany) were dissolved in 100 g of methanol and the resulting solution was slowly added at a rate of 10 g/h to the diluted sol. After the addition was complete, the already turbid solution was stirred at room temperature for a further 5 hours. After addition of 270 g of polyol 1, the silanized sol quickly became gel-like.

Example G12

300 g of a commercially available acidic aqueous silica sol (Levasil® 200E/20% from H.C. Stark GmbH & Co KG, Leverkusen, Germany, particle diameter based on the BET method: 15 nm, pH 2.5, silicon dioxide concentration: 20% by weight) and 300 g of isopropanol were mixed. After slow addition of 13.3 g of 3-aminopropyltriethoxysilane (from Merck Schuchardt OHG, Hohenbrunn, Germany), a gel-like product was obtained.

The invention claimed is:
1. A process for producing at least one silicate-comprising polyol, the process comprising:
(i) admixing an aqueous silica sol (K) having an average particle diameter of from 1 to 150 nm, a silica content, calculated as $SiO_2$, of from 1 to 60% by weight, and a pH of from 1 to 6,
with a 0.1- to 20-fold amount, based on an amount of water in the sol, of at least one organic solvent (L) selected from the group consisting of methanol, ethanol, 1-propanol, 2-propanol, 1-butanol, 2-butanol, 2-methyl-2-propanol, 1-chloro-2-propanol, cyclopentanol, cyclohexanol, 1,4-dioxane, tetrahydrofuran, 2-ethoxyethanol, 1-methoxy-2-propanol, 2-methyl-2-propanol, 1-ethoxy-2-propanol, 2-methoxyethanol, dimethylformamide, acetonitrile, dimethyl sulfoxide acetone, methylethylketone, and ethylacetate, to obtain a resulting mixture;
(ii) admixing of the resulting mixture with a polyol;
(iii) then at least partially removing the water and organic solvent (L) by distillation, thereby obtaining a silicon dioxide dispersion in the polyol;
(iv) subsequently to (i), (ii), and (iii), admixing the silicon dioxide dispersion in the polyol obtained in (iii) with 0.1 to 30 mol %, based on the $SiO_2$ content, of at least one compound (S) which comprises at least a mono-, di- or tiralkoxylated silyl group and at least one substituent selected from the group consisting of an alkyl, cycloalkyl, and aryl substituent which optionally comprises at least one hetero atom, and wherein the substituent optionally comprises a group which is reactive toward an alcohol, an amine, or an isocyanate, wherein the compound (S) is silane or bis(silane); and
(v) optionally, adjusting the pH of the silicate-comprising polyol to a value of from 7 to 12 by addition of a basic compound,
wherein the adjusting (v) is optionally carried out between (iii) and (iv).
2. The process of claim 1, wherein the compound (S) comprises one alkoxylated silyl group

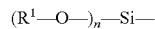

wherein
$R^1$ is $C_1$-$C_{20}$-alkyl, and
n is an integer from 1 to 3.
3. The process of claim 2, wherein $R^1$ is $C_1$-$C_4$-alkyl and n is 2 or 3.
4. The process of claim 1, wherein the compound (S) comprises a non-reactive alkyl, cycloalkyl, or aryl substituent, which optionally comprises at least one heteroatom.
5. The process of claim 1, wherein the compound (S) comprises an alkyl, cycloalkyl, or aryl substituent, having a primary amino group, a hydroxy group, a thiol group, or an epoxy group as reactive group.
6. The process of claim 1, wherein the pH of the aqueous silica sol (K) employed in the admixing (i) is from 2 to 6, its average particle diameter is from 5 to 150 nm, and its silica content is from 10 to 60% by weight.
7. The process of claim 6, wherein the polyol comprises a polyether polyol.
8. The process of claim 6, wherein the average particle diameter is from 5 to 120 nm.
9. The process of claim 6, wherein the average particle diameter is from 5 to 100 nm.
10. The process of claim 6, wherein the average particle diameter is from 5 to 80 nm.
11. The process of claim 6, wherein the average particle diameter is from 5 to 50 nm.

12. The process of claim 6, wherein the compound (S) comprises one alkoxylated silyl group $(R^1\text{—O—})_n\text{—Si—}$ wherein
$R^1$ is $C_1$-$C_{20}$-alkyl, and
n is an integer from 1 to 3.

13. The process of claim 12, wherein $R^1$ is $C_1$-$C_4$-alkyl and n is 2 or 3.

14. The process of claim 1, wherein the polyol comprises a polyether polyol.

15. The process of claim 14, wherein the compound (S) comprises one alkoxylated silyl group $(R^1\text{—O—})_n\text{—Si—}$ wherein
$R^1$ is $C_1$-$C_{20}$-alkyl, and
n is an integer from 1 to 3.

16. The process of claim 15, wherein $R^1$ is $C_1$-$C_4$-alkyl and n is 2 or 3.

17. The process of claim 1, wherein
the polyol comprises a polyether polyol comprising reacted ethylene oxide and propylene oxide,
or
the polyol comprises a polyether polyol comprising reacted polytetrahydrofurane having a number average molecular weight of from 550 to 4000 g/mol.

18. The process of claim 17, wherein the compound (S) comprises one alkoxylated silyl group $(R^1\text{—O—})_n\text{—Si—}$ wherein
$R^1$ is $C_1$-$C_{20}$-alkyl, and
n is an integer from 1 to 3.

19. The process of claim 18, wherein $R^1$ is $C_1$-$C_4$-alkyl and n is 2 or 3.

* * * * *